Nov. 15, 1927.
W. S. IRELAND
1,649,116
CLUTCH
Filed July 5, 1923    2 Sheets-Sheet 2
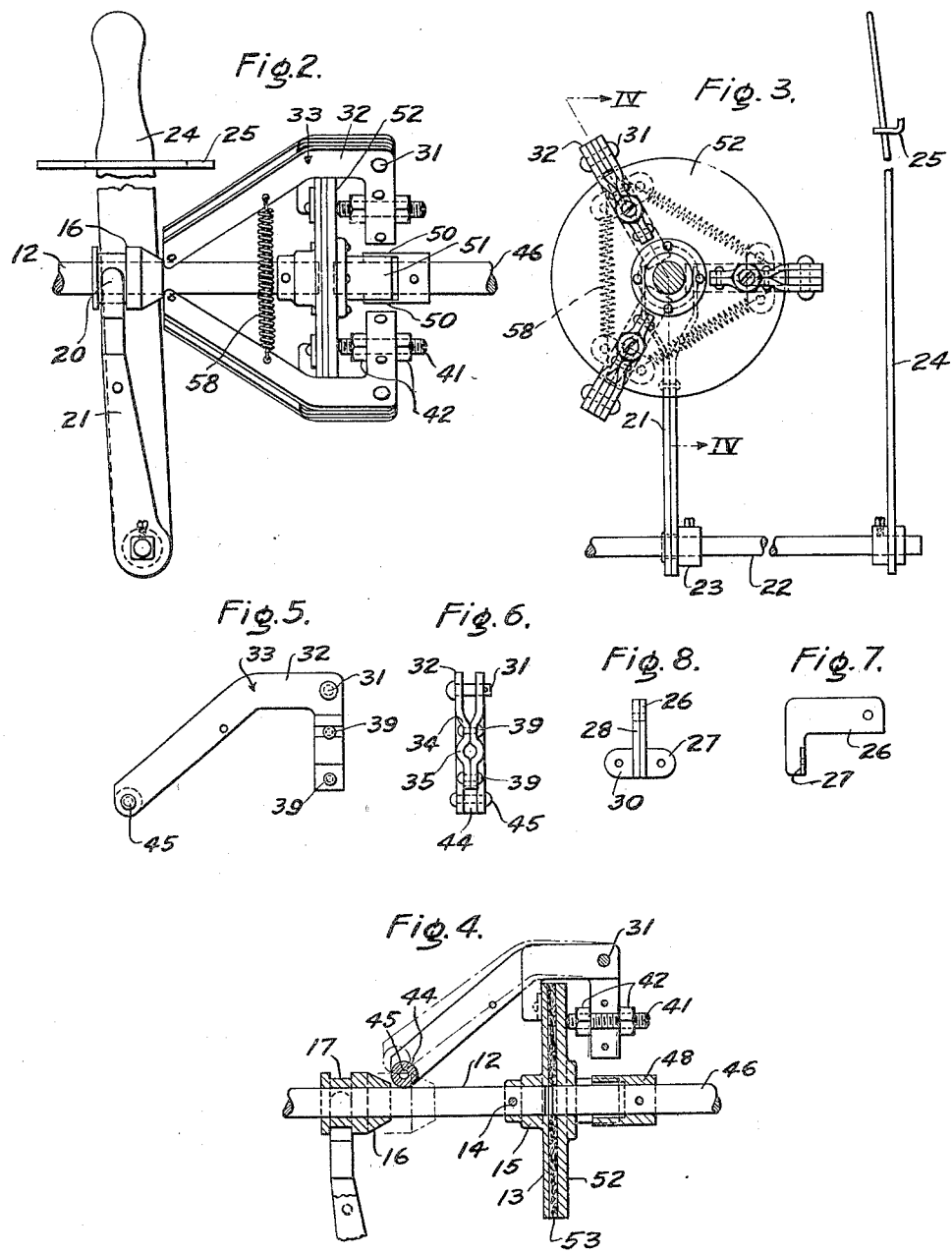
INVENTOR
Ward S. Ireland Patented Nov. 15, 1927.

1,649,116

UNITED STATES PATENT OFFICE.

WARD S. IRELAND, OF ST. PAUL, MINNESOTA.

CLUTCH.

Application filed July 5, 1923. Serial No. 649,579.

My invention relates to clutches, and it has special relation to a clutch of the disc type.

An object of the invention is to provide a clutch the parts of which are stamped and formed.

Another object of the invention is to provide a clutch having engaging discs and adjustable means for varying the application of pressure to one of the discs so that the clutch action and wear between the discs is uniform.

A further object of the invention is to provide simple resilient means for throwing the clutch out.

A still further object of the invention is to provide a clutch that is simple in construction, easy to manufacture and of a low cost of production.

Other objects will appear as the description proceeds.

Fig. 2 is a side elevational view of the clutch of my invention;

Fig. 3 is an end elevational view of the parts as shown in Fig. 2;

Figure 1:
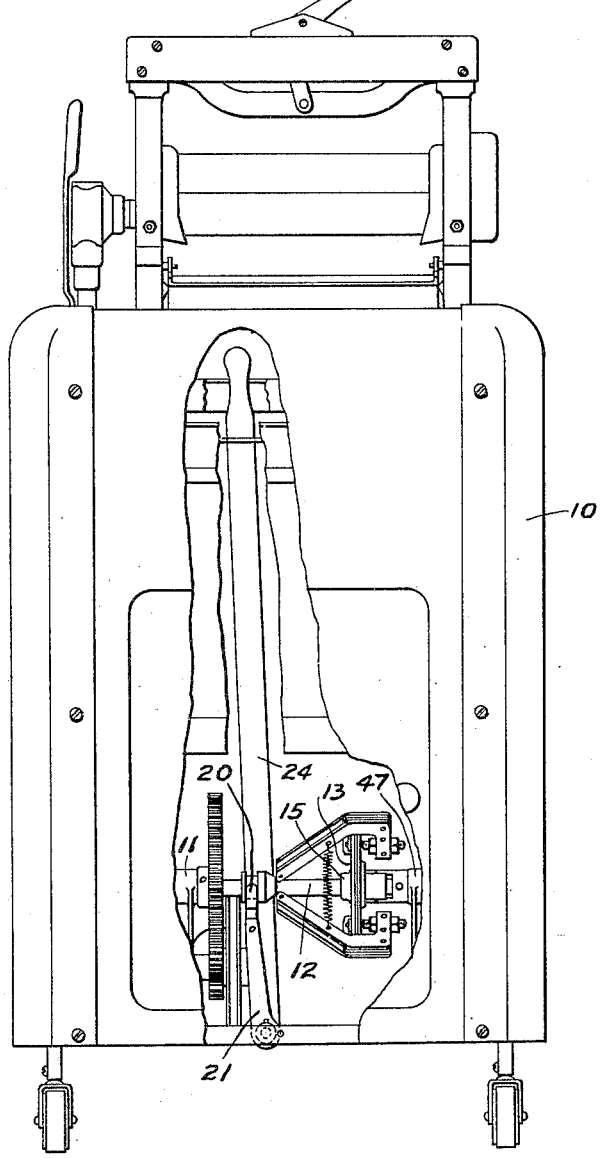
Figure 1 is a side elevational view of a washing machine with parts broken away to facilitate showing of the clutch structure.

Fig' 4 is a sectional view on the line IV—IV of Fig. 3;

Figs. 5 and 6 are detail views of the finger structure; and

Figs. 7 and 8 are detail views of the bracket structure.

As applied to a washing machine the clutch is positioned in a cabinet 10 in which a bearing 11 is suitably supported, a drive shaft 12 being journaled therein. A plate 13 is secured at the end of the shaft by means of a pin 14 directed through a boss 15 on the plate (Fig. 4). A cam 16 is slidably mounted on the drive shaft and is formed conically at the end nearest the plate 13. The cam is provided with an annular race 17 which receives the upper ends of a yoke 20 formed by diverging upper portions of a pair of elongated pieces 21 that are secured together immediately below the yoke to form an arm.

A rock shaft 22 extends through an opening in the arm and is made rigid therewith by a collar 23, a squared portion of which extends through the opening and is flattened against the arm. The rock shaft is controllable by a manually operable lever 24. The rock shaft 22 is supported for rocking movement in a suitable manner not constituting a part of the present invention.

A bracket 26 is secured near the edge of plate 13 by means of an ear 27 bent angularly from said bracket. The bracket engages a second bracket 28 having an ear 30 extending in an opposite direction to ear 27, and also secured to plate 13. The brackets 26 and 28 are of L-shape and extend a short distance beyond plate 13, being provided with a pivot 31, for a pair of fingers 32. The fingers are bent at right angles at the pivot point and are also directed at an inclination from a point 33 toward cam 16, on drive shaft 12, adjacent to which the free ends of the fingers are located.

Immediately below pivot 31 fingers 32 are each formed into a lateral bend 34 adjacent to which is a semi-circular deformation 35. Pins 39 on opposite sides of deformation 35 secure the fingers 32 together at this point. A screw 41 is threaded into the opening formed by deformation 35, and is adjustably secured in position by lock nuts 42. At their other ends the fingers 32 are spaced apart by a roller 44 free to turn on pin 45 that also secures the fingers 32 together. It will be noted that there are three sets of fingers 32 and associated brackets 26 and 28 spaced equally about the circumference of plate 13, each finger terminating at one end adjacent cam 16 on shaft 12.

A driven shaft 46 is journaled in a bearing 47 and is aligned with drive shaft 12. The shaft 46 has pinned thereto a sleeve 48 provided with a pair of spaced teeth 50. Similar teeth 51 are formed integrally on plate 52 and are adapted to engage teeth 50. The plate is disposed immediately adjacent to plate 13 and slidable longitudinally on driven shaft 46 but prevented from rotation with respect thereto by the action of the engaging teeth. A fiber disc 53 is secured to the face of plate 52 between it and plate 13.

In the operation of the device, when it is desired to throw the clutch on, the operator moves control lever 24 and thus shaft 22 rocks arm 20 to move cam 16 toward plate 13. The conical surface of cam 16 is brought into engagement with the rollers 44 to rock the actuating means or fingers on their supporting brackets thus bringing the screws 41 into contact with plate 52. Further movement of cam 16 slides plate 52 longitudinally to bring disc 53 into contact with plate 13 under pressure. The rotation of shaft 12 is then transmitted, by reason of the frictional action of the plate and the disc to driven shaft 46.

When the rollers reach the cylindrical surface of cam 16 movement of the cam is arrested as lever 24 then reaches the end of the slot in frame 25.

For release, the lever 24 is returned to its original position operating through shaft 22 and arm 20 to retract cam 16. Connected between each set of fingers 32 are springs 58 so that as the cam 16 is withdrawn the fingers move inwardly under the impulse of the springs. The screws carried by the fingers are thus moved away from plate 52 permitting free relative movement between plates 52 and 13 so that the rotation of drive shaft 12 is not transmitted to driven shaft 46.

Screw 41 and the similar screws may be adjusted in an obvious manner and by their relative adjustment the pressure exerted through them may be so regulated that the face of disc 53 is in even contact with the face of plate 13 and a uniform frictional action results.

Substantially all parts of the clutch assembly and operating parts are stamped and formed metal, and are so assembled that major stresses occur in the planes in which the respective parts lie.

The invention is not limited to details of construction illustrated and described but is capable of extensive variation and modification and a substantial range of equivalents is contemplated within the scope of the appended claims.

I claim as my invention:

1. In a clutch, the combination comprising a plate, a pair of mating and contacting L-shaped sheet metal brackets, an ear laterally bent from each of said brackets and means securing said ears to said plate.

2. In a clutch, the combination comprising a plate, a bracket secured thereto and a pair of sheet metal fingers on opposite sides of said bracket and pivoted thereto said fingers being secured together at their ends.

3. In a clutch, the combination of a plate, a bracket secured thereto, a pair of sheet metal fingers pivoted to and spaced apart by said bracket, each of said fingers being deformed semi-circularly whereby a circular opening is formed between said fingers and a screw received in said opening.

4. In a clutch, the combination of a plate, a bracket secured thereto, a pair of sheet metal fingers pivoted to and spaced apart by said bracket, each of said fingers being deformed semi-circularly whereby a circular opening is formed between said fingers a screw received in said opening and a pair of nuts on said screw spaced apart by and abutting against said fingers.

In testimony whereof, I have hereunto subscribed my name this thirtieth day of June, 1923.

WARD S. IRELAND.